United States Patent [19]

Burgkhart et al.

[11] Patent Number: 4,492,872
[45] Date of Patent: Jan. 8, 1985

[54] ALBEDO DOSIMETER ENCAPSULATION

[75] Inventors: Bertram Burgkhart, Karlsruhe, Fed. Rep. of Germany; Gabor Hassib, Cairo, Egypt; Ernst Piesch, Eggenstein-Leopoldshafen, Fed. Rep. of Germany

[73] Assignee: Kernforschungszentrum Karlsruhe GmbH, Karlsruhe, Fed. Rep. of Germany

[21] Appl. No.: 379,694

[22] Filed: May 19, 1982

[30] Foreign Application Priority Data

May 22, 1981 [DE] Fed. Rep. of Germany ....... 3120373

[51] Int. Cl.$^3$ ............................................. G01T 1/11
[52] U.S. Cl. ............................ 250/484.1; 250/486.1
[58] Field of Search ............. 250/484.1, 485.1, 486.1, 250/487.1, 488.1, 472.1, 337; 250/390

[56] References Cited

U.S. PATENT DOCUMENTS

| | | | |
|---|---|---|---|
| 4,100,414 | 7/1978 | Distenfeld | 250/391 |
| 4,286,165 | 8/1981 | Jones et al. | 250/484.1 |
| 4,383,179 | 5/1983 | Eisen et al. | 250/472.1 |

OTHER PUBLICATIONS

Piesch et al., "Supralinearity and Re-evaluation of TLD 600 and TLD 700 in Mixed Neutron and Gamma Fields", Fourth International Conference on Luminescence Dosimetry, Krahow-Poland, Aug. 1974, pp. 1201 to 1212.
Piesch et al., "A New Technique for Neutron Monitoring in Stray Radiation Fields", Fifth International Conference of IRPA, Jerusalem, 1980, pp. 121 to 124.
Piesch et al., "Application of the TLD Albedo Technique for Monitoring and Interpretation of Neutron Stray Radiation Fields", Nuclear Instruments and Methods, 175, 1980, pp. 180 to 182.
Dale E. Hankins, "A Small, Inexpensive Albedo-Neutron Dosimeter", Los Alamos Scientific Laboratory LA-5261, University of California, Jul. 1973, pp. 1 to 8.

Primary Examiner—Janice A. Howell
Assistant Examiner—Constantine Hannaher
Attorney, Agent, or Firm—Sughrue, Mion, Zinn, Macpeak and Seas

[57] ABSTRACT

Albedo dosimeter encapsulation for measuring neutron and gamma radiation in at least two dosimeter zones, comprises a casing having cadmium or boron containing walls which have neutron absorbing capability. The casing has a front side which faces a radiation field and a rear side which faces a body which carries the encapsulation. The rear side of the casing is closed by a cadmium or boron containing rear wall having a first portion and a second portion. A cover is located at the front side of the casing and has a cadmium or boron containing wall portion and a window portion. The casing has a first zone for holding a first dosimeter means and a second zone for holding a second dosimeter means. The first zone is aligned with the cadmium or boron containing wall portion of the cover and the first portion of the rear wall. The second zone is aligned with the window portion of the cover and the second portion of the rear wall. The cadmium or boron containing wall portion of the cover has a neutron absorbing capability which is different from the neutron absorbing capability of the first portion of the rear wall. The first portion of the rear wall has a neutron absorbing capability which is different from the neutron absorbing capability of the second portion of the rear wall.

9 Claims, 3 Drawing Figures

4,492,872

ALBEDO DOSIMETER ENCAPSULATION

BACKGROUND OF THE INVENTION

The present invention relates to an albedo dosimeter encapsulation for measuring neutron and gamma radiation, the arrangement having at least two dosimeter zones.

Neutron dosage measurements are preferably made by means of albedo dosimeters which include TLD (thermoluminescence dosimeter) detectors that record gamma radiation and neutrons in the same manner. The measured neutron values are separated, for example, by means of $^6$LiF and $^7$LiF dosimeter pairs which have the same gamma sensitivity but different neutron sensitivities. The detection of thermal neutrons is here made by way of a nuclear reaction $^6$Li(n,α)$^3$H. The difference in measured values of such pairs of TLD dosimeters is thus proportional to the neutron fluency of thermal neutrons:

$$a = a(^6\text{LiF}) - a(^7\text{LiF})$$

An albedo dosimeter is a dosimeter encapsulation of a cadmium or of a boron containing plastic in which is disposed a pair of dosimeters or a combination of TLD detectors. The Hankins single dosimeter (Hankins, D. E. Reports LA-5261 (1973)) comprises a pair of dosimeters in the center of a polyethylene moderator which is encased on all sides by cadmium. The Karlsruhe albedo neutron dosimeter (Piesch et al, Proc. Int. Conf. of Luminescence Dosimetry, Krakow (1974), p. 1201) includes three pairs of dosimeters, with the values measured from two pairs of dosimeters m and a, in addition to the albedo dosimeter i, providing the values for the analysis of the neutron spectrum and thus for the determination of the locus dependent calibration factor for the albedo dosimeter i.

The advantage of the single dosimeter is the negligible influence of the distance between the dosimeter and the body of the person carrying the dosimeter. A drawback of the single dosimeter is an error in the dosage determination up to a factor of 20. In comparison therewith, the Karlsruhe albedo dosimeter is able to determine the neutron equivalent dose in a given scattered radiation field to ±25%. Body contact, i.e. the wearing of a dosimeter belt, however, is required for the Karlsruhe albedo dosimeter. Other advantages of the Karlsruhe albedo dosimeter result from the possibility of analyzing the neutron radiation field during phanthom calibration with a single sphere albedo measuring technique, and of obtaining the measured data relating to the scattered neutron radiation field immediately after examination of the dosimeters by means of an on-line computer program (Piesch et al, Nucl. Instr. Meth. 175 (1980) pages 180 to 182). The drawback here is the cumbersome insertion and removal of the detectors into and out of the encapsulation.

SUMMARY OF THE PRESENT INVENTION

It is an object of the present invention to develop a dosimeter encapsulation for measuring the personal dose of gamma radiation and neutrons in an arrangement which can be usable universally for different dosimeter systems.

A further object of the present invention is to provide such an encapsulation which preferably employs a thermoluminescence dosimeter card for direct automatic evaluation as well as a gamma radiation insensitive nuclear track detector.

Additional objects and advantages of the present invention will be set forth in the description which follows and in part will be obvious from the description or can be learned by practice of the invention. The objects and advantages are achieved by means of the products, instrumentalities and combinations particularly pointed out in the appended claims.

To achieve the foregoing objects and in accordance with its purpose, the present invention provides (a) a casing having cadmium or boron containing walls which have radiation absorbing capability, the casing having a front side which faces a radiation field and a rear side which faces a body which carries the encapsulation, the rear side being closed by a cadmium or boron containing rear wall having a first portion and a second portion; (b) a cover located at the front side of the casing, the cover having a wall portion containing boron or cadmium and a window portion; and (c) the casing having a first zone for holding a first dosimeter means and a second zone for holding a second dosimeter means, the first zone being aligned with the cadmium or boron containing wall portion of the cover and the first portion of the rear wall, and the second zone being aligned with the window portion of the cover and the second portion of the rear wall, the cadmium or boron containing wall portion of the cover having a neutron absorbing capability which is different from the neutron absorbing capability of the first portion of the rear wall, and the first portion of the rear wall having a neutron absorbing capability different from the neutron absorbing capability of the second portion of the rear wall.

The differences in neutron absorbing capability can be achieved by different wall thickness, by different amounts of neutron absorber additive in the form of boron or cadmium in the walls, or by a combination thereof. Generally, the neutron absorbing capability of the cadmium or boron containing wall portion of the cover is greater than the neutron absorbing capability of the first portion of the rear wall, and the neutron absorbing capability of the second portion of the rear wall is greater than the neutron absorbing capability of the first portion of the rear wall.

In one preferred embodiment of the present invention, the albedo dosimeter encapsulation contains a thermoluminescence detector and a nuclear track detector.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

DETAILED DESCRIPTION OF THE INVENTION

The albedo dosimeter encapsulation of the present invention for measuring neutron and gamma radiation in at least two dosimeter zones comprises a housing or casing whose walls are made of a cadmium or boron containing plastic material to provide a neutron absorbing capability. The casing is closed at its rear side which faces the person or body which carries the encapsulation, and a cover is located at the front side of the casing which faces the radiation field. The casing has at least two zones, and the walls of the casing in each zone are designed differently to provide different neutron absorption in each zone. The wall of the cover similarly is designed to contribute to the different neutron absorption in each zone. The interior of the casing can receive various radiation detectors including thermoluminescence detectors, nuclear track detectors, and (n,α) convertor foils.

The invention will now be explained in greater detail with the aid of FIGS. 1 to 3 and Tables 1 and 2.

Figure 1:
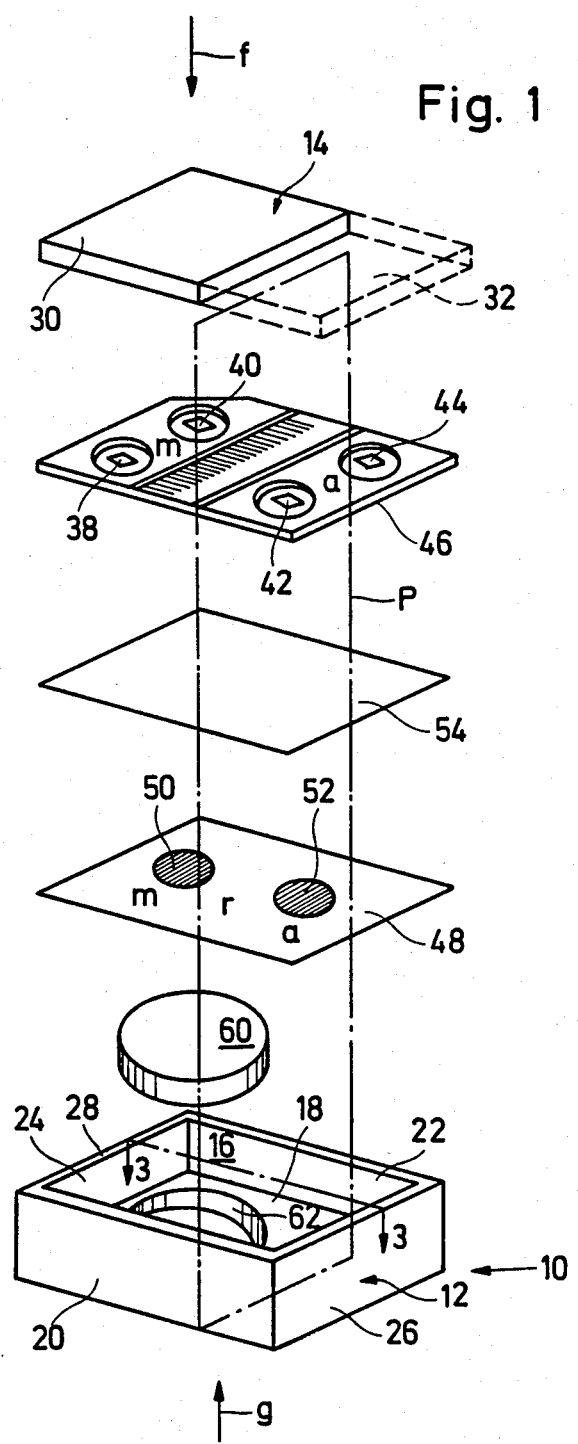
FIG. 1 is an exploded perspective view of an albedo dosimeter encapsulation in accordance with the teachings of the present invention.
Figure 2:
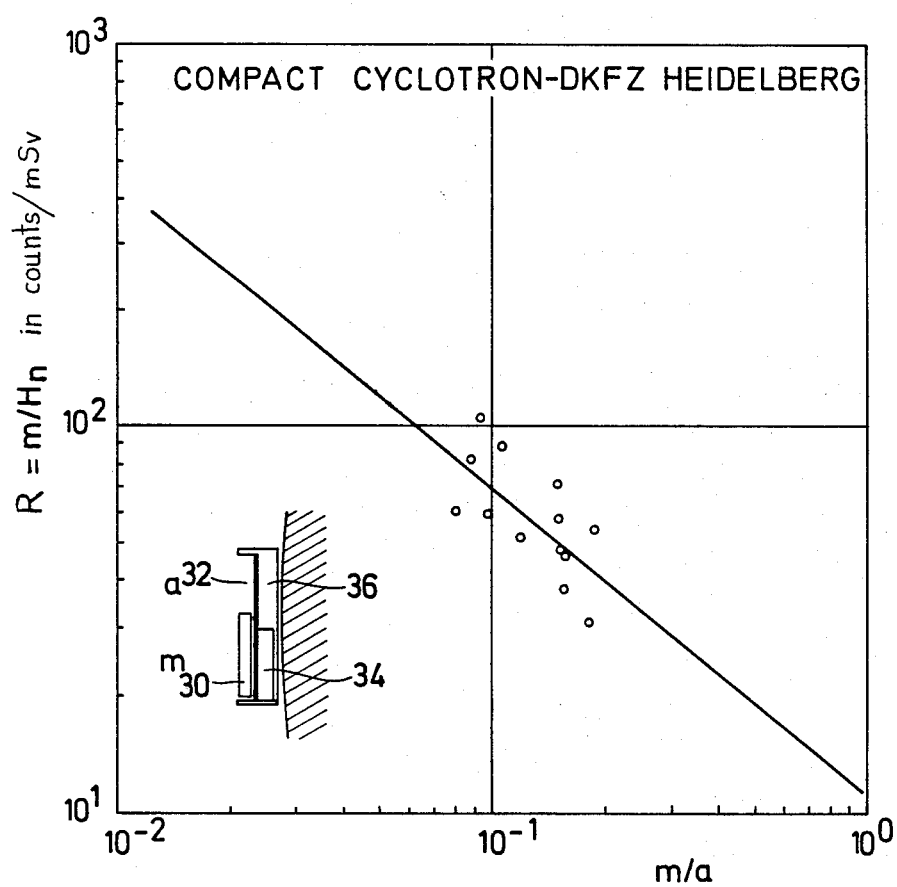
FIG. 2 is a graph showing the response capability as determined at various locations for an albedo dosimeter means located in a first zone "m" versus the measuring value ratio m/a for an albedo dosimeters located in zone "m" and in a second zone "a" in accordance with the teachings of the present invention.

FIG. 1 is an exploded perspective view of the albedo dosimeter encapsulation, generally 10, including a casing or housing 12 and a cover 14. Casing 12 is preferably given a square block shape and has a hollow interior 16. Casing 12 comprises a rear wall 18 which faces the person or body which is carrying the encapsulation, side walls 20 and 22, end walls 24 and 26, and a front 28 which is open and faces the radiation field. Cover 14 is located at front 28 of casing 12 and has a cadmium or boron containing wall portion 30 which closes a portion of the front of casing 12 and a window portion 32 which is substantially free of neutron absorbing means. The direction of neutrons from the radiation field is represented by arrow "f" in FIG. 1 and the direction of neutrons from the person or body which carries encapsulation 10 is represented by arrow "g" in FIG. 1.

Casing 12 contains at least two zones for holding dosimeter means. As shown in FIG. 1, casing 12 contains a first zone "m" which is to the left of an imaginary plane "p" which is parallel to and between end walls 24 and 26, and a second zone "a" which is to the right of plane "p". As best seen in FIG. 3, and as schematically shown in FIG. 2, first zone "m" is aligned with the cadmium or boron containing wall portion 30 of cover 14 and with a first portion 34 of rear wall 18. Second zone "a" is aligned with window portion 32 of cover 14 and with a second portion 36 of rear wall 18.

The cadmium or boron wall portion 30 of cover 14 has a neutron absorbing capability which is different from the neutron absorbing capability of first portion 34 of rear wall 18. This difference in neutron absorbing capability can be achieved by having the wall thickness of wall portion 30 of cover 14 differ from the wall thickness of first wall portion 34, as shown in FIG. 3, with each wall portion having the same neutron absorbing capability per mm of thickness as a result of having the same density or amount of boron or cadmium. Alternatively, wall portion 30 of cover 14 and first wall portion 34 of rear wall 18 can have the same wall thickness, with each mm of thickness having different neutron absorbing capability as a result of different densities or amounts of boron or cadmium. In general, wall portion 30 of cover 14 has a greater neutron absorbing capability than first wall portion 34 of rear wall 18. Thus, wall portion 30 of cover 14 can be thicker than wall portion 34, or with the same thickness can have a greater amount of cadmium or boron per mm thickness than the amount per mm thickness in wall portion 34. A combination of different wall thickness and different amounts of cadmium or boron per mm wall thickness can also be used to impart the different neutron absorbing capabilities.

First portion 34 of rear wall 18 has a different neutron absorbing capability than second portion 36 of rear wall 18. This difference in neutron absorbing capability similarly can be achieved by having the wall thickness of wall portion 34 differ from the wall thickness of wall portion 36, with each wall portion having the same neutron absorbing capability per mm of thickness. Alternatively, wall portion 34 and wall portion 36 can have the same wall thickness, but different amounts of boron or cadmium. In general, first wall portion 34 of wall 18 has less neutron absorbing capability than second wall portion 36 of rear wall 18. Thus, first wall portion 34 can be thinner than wall portion 36, as shown in FIG. 3, or with the same thickness can have a greater amount of cadmium or boron per mm thickness. A combination of different wall thicknesses and different amounts of cadmium or boron can be used to impart the different neutron absorbing capabilities.

In one embodiment of the present invention, first zone "m" contains a first dosimeter means in the form of a pair of dosimeters 38 and 40, and second zone "a" contains a second dosimeter means in the form of a pair of dosimeters 42 and 44. Dosimeters 38, 40, 42, and 44 are thermoluminescence detectors, and can be mounted on a TLD holder or card 46, which can be, for example, a commercial TLD holder sold by Studsvik or a commercial TLD holder sold by Harshaw.

In the present embodiment of the invention, therefore, commercial TLD dosimeter cards (dosimeter encapsulations) are used which contain at least two pairs of dosimeters, with one pair of dosimeters being in first zone "m" and one pair of dosimeters being in second zone "a". Dosimeter card 46 preferably is rectangular as shown in FIG. 1, and preferably holds the dosimeters 38 to 44 in one plane. Dosimeters 38 to 44 can be evaluated automatically by means of commercial evaluation devices. Dosimeters 38 to 44 can be bought assembled on a dosimeter holder 46, which assembly, for example, as made by Harshaw and Teledyne, contains four detectors, e.g. lithium-Teflon dosimeters, which are arranged in two pairs, with one pair being in one zone and the other pair being in a second zone, and with each dosimeter in the first pair being laterally aligned with and equally spaced from a dosimeter of the second pair to form two rows of dosimeters, as shown in FIG. 1. Alternatively, instead of arranging the dosimeters into two rows, an assembly of a dosimeter card and four detectors, as made by Studsvik and Panasonic, can be used in which the four detectors are arranged one behind the other in a single row, with the first two dosimeters being in zone "m" and the second two dosimeters being in zone "a". The dosimeter card 46 with its dosimeters 38 to 44 is inserted directly into the universal dosimeter encapsulation 10 and removed for the automatic evaluation of the albedo encapsulation.

The albedo dosimeter encapsulation 10 thus includes a dosimeter card, preferably equipped with two pairs of dosimeters, which are arranged one behind the other in a single row or next to one another to form two rows. As already stated, the albedo dosimeter of this embodiment of the present invention comprises a rectangular, cadmium or boron containing plastic encapsulation 10 which is closed at the rear side 18 facing the person carrying the dosimeter encapsulation and has a window 32 at the front side 28 of a shape which is preferably rectangular or round, with one pair of dosimeters 42 and 44 in zone "a" being covered by the cadmium or boron containing encapsulation behind window 32, and another pair of dosimeters 38 and 40 in zone "m" being covered by the cadmium or boron containing encapsulation 10 on five sides 18, 20, 26, 28, and 30.

The albedo dosimeter encapsulation of the present invention provides a number of advantages for the measurement of neutron and gamma radiation for universal use in personnel monitoring. In particular, in the first zone "m", which is an albedo detector zone, by different design of the wall thickness or of the neutron absorber additive in the casing and cover, in particular, by different design of the front cover wall portion 30, window 32 and rear wall portion 34 of encapsulation 10, and by different design of rear wall 18 in detector zones "m" and "a", low energy neutrons are absorbed in zone "m" in such a manner that albedo neutrons impinging from the body of the person carrying the encapsulation are detected predominantly in zone "m", and a discrimination is made in zone "m" with respect to low-energy neutrons impinging from the radiation field. The discrimination here refers to the fact that low-energy neutrons impinging from the radiation field do not penetrate into zone "m" as much as they penetrate into zone "a".

In the detector zone "a", by different design of the wall thickness or of the neutron absorber additive in the casing and cover, of the front and rear side of the dosimeter encapsulation 10 (in particular, by having a window 9 in zone "a" and a cadmium or boron containing cover wall portion 30 in zone "m", and by having a rear wall 18 with a wall portion 36 in zone "a" and a wall portion 34 in zone "m"), low-energy neutrons are absorbed in zone "a" in such a manner than low-energy neutrons impinging from the radiation field are detected predominantly in zone "a", and that a discrimination is made in zone "a" with respect to neutrons impinging from the body. The discrimination here refers to the fact that neutrons impinging from the body do not penetrate into zone "a" as much as they penetrate into zone "m".

In detector zone "m", the cadmium or boron containing dosimeter encapsulation 10 causes thermal neutrons to be absorbed on the side facing the person carrying the dosimeter, that is, at first portion 34 of rear wall 18, and epithermal albedo neutrons predominantly pass through a first portion 34 of rear wall 18. The epithermal albedo neutrons, after additional moderation in hydrogeneous material portion 60 within the casing 10 in the region of detector zone "m", are recorded in detectors 38 and 40 as thermal neutrons and epithermal neutrons.

To increase the sensitivity of the neutron dosimeter means 38 and 40 located in zone "m", in accordance with one embodiment of the present invention as previously discussed, the boron or cadmium containing encapsulation 10 is made thinner on side 18 facing the body of the person carrying the encapsulation in first wall portion 34 as compared to second wall portion 36, so that slow neutrons emanating from the body are absorbed only in part by wall portion 34 in zone "m" compared to the absorption by wall portion 36 in zone "a" which absorbs more slow neutrons than wall portion 34.

In a preferred embodiment of the present invention, to increase the sensitivity of the neutron dosimeter means 38 and 40 located in zone "m", a hydrogen containing moderator 60, e.g. made of polyethylene, can be disposed in a preferably circular recess 62 in rear wall 18. Moderator 60 is aligned with dosimeters 38 and 40, so as to cover both dosimeters 38 and 40 and generate additional thermal neutrons in one side or both of dosimeters 38 and 40 due to moderation.

Moreover, to increase the sensitivity of the neutron dosimeter means located in zone "m", the boron or cadmium proportion at front side 28 in wall portion 30 of cover 14 of encapsulation 10 is higher than at first wall portion 34 of rear wall 18 facing the carrier of the dosimeter so as to provide better separation between neutrons from the radiation field which impinge from the front and albedo neutrons emanating from the body which impinge from the rear. As previously discussed, the higher boron or cadmium content at wall portion 30 can be achieved either by a greater wall thickness for wall portion 30, by a larger density of cadmium or boron in wall portion 30, or by a combination of greater wall thickness and higher density of cadmium or boron.

The albedo dosimeter equipped with TLD detectors 38 to 44 is a gamma-neutron dosimeter for which, as is also the case with the single dosimeter according to Hankins, no body contact is required but which, in contradistinction thereto, permits, with the aid of the two dosimeter zones "m" and "a", an analysis of the scattered neutron radiation field, i.e. a locus dependent correction of the dosimeter sensitivity.

As an example for the energy dependence of the dose indication, Table 1 below shows the corresponding response capability of the albedo dosimeter pair 38 and 40 located in zone "m" as well as of dosimeter detectors 42 and 44 in zone "a" for mono-energetic neutrons. The calibration was made at the PTB (Physikalisch-Technische Bundesaustalt), Brunswick. The determination of the equivalent dose results from the neutron fluence value under consideration of the corresponding fluence-to-dose equivalent conversion factor. For practical application of the albedo dosimeter encapsulation of the present invention in personnel monitoring, field calibrations are made in the scattered radiation field of interest. The reference measuring device for determining the dose equivalent is a rem-meter which comprises a polyethylene sphere having a diameter of 30 cm. This reference device is simultaneously a phanthom for the albedo dosimeter encapsulation to be calibrated. A prototype albedo dosimeter was made of boron loaded plastic with $B^{10}$ thicknesses of 15 mg/cm$^2$ for wall portion 34 and 60 mg/cm$^2$ for wall portions 30 and 36. The example given in FIG. 2 is the calibration of the albedo dosimeter at the compact cyclotron of the Heidelberg Cancer Research Center (DKFZ) (Table 2). The dosimeter response R (dosimeter reading for 1 rem neutron dose equivalent) as determined at various locations for the albedo dosimeter pair in zone "m" is shown in FIG. 2 in dependence on the reading ratio m/a where m indicates the measured value for the dosimeters in zone "m" and a indicates the measured value of the dosimeters in zone "a". Readings m, a, and r are given in counts and $H_n$ in mSv (1mSv=100 mrem). A straight line was placed through the detected measuring points. The thus determined response Rasa function of the reading ratio m/a serves to correct the locus dependence of the response when the albedo dosimeter is in use for personnel monitoring. If during use a personnel dosimeter indicates a certain reading ratio m/a, then the measuring value m of the albedo dosimeter is divided, by means of a small calculator, by the respective response value. The dose equivalent then results as follows:

$$H_n = \frac{m}{R} = 0.089 \left(\frac{m}{a}\right)^{0.8} \text{Sv} \times m$$

The dosimeter encapsulation 10, according to the present invention, is dimensioned in such a manner that in addition to manual evaluation of individual dosimeters in most commercial dosimeter cards designed for automatic read-out systems can be used. Upon removal from the dosimeter encapsulation 10, the dosimeter card, e.g. card 46, is heated to about 300° C. for evaluation in an automatic reader, this usually being effected in existing evaluation devices by contact heating with a heating finger, blowing in hot nitrogen gas or heating by means of an infrared flash.

The albedo dosimeter encapsulation 10 with the measuring zones "m" and "a" can selectively also be used together with nuclear track detector means, and under certain circumstances also simultaneously with nuclear track detector mean and TLD detector means. In the case of a simulataneous use of nuclear track detector means and TLD detector means, the nuclear track detector means comprises a nuclear track detector in dosimeter zone "m" and a nuclear track detector in dosimeter zone "a", and is preferably disposed behind TLD dosimeter card 46 when seen in the direction of impingement of the radiation from the radiation field. The nuclear track detector means preferably is in the form of a foil 48 which detects alpha particles, with a portion of the foil being located in zone "m" and a portion of the foil being located in zone "a". In each of the dosimeter zones "m" and "a", the nuclear track detector means in the form of foil 48 is covered, e.g. on one side, by an (n,α) convertor foil. As shown in FIG. 1, an (n,α) converter foil 50 is fixed on a portion of the diaphragm foil 48 located in zone "m" and an (n,α) converter foil 52 is fixed on a portion of the diaphragm foil 48 located in zone "a". Converter foils 50 and 52 can contain $^6$Li or they can contain $^{10}$B. When thermal neutrons are received, alpha particles are recorded in the nuclear track detector foil 54 which, subsequent to chemical, preferably electrochemical, etching, are counted under a microscope or on a screen of a microfiche reader. In order to increase the measuring range, the converter foils 50 and 52 may contain different proportions of $^6$Li or $^{10}$B or may be partially covered by an additional alpha absorber foil positioned between diaphragm 48 and detector foil 54. Foils 48 and 54 act as dosimeter cards and can be inserted directly into the interior of casing 12.

Figure 3:
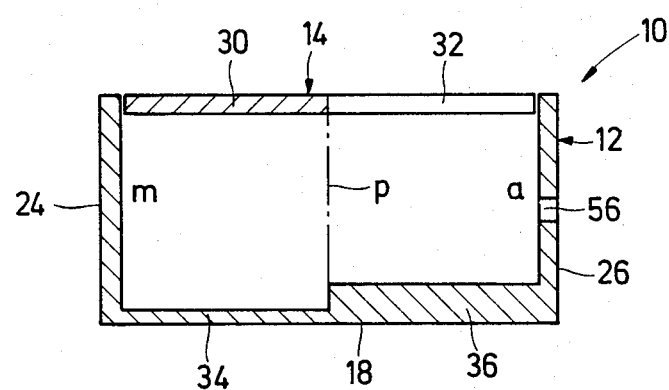
FIG. 3 is a sectional view of one embodiment of a casing and cover of an albedo dosimeter encapsulation in accordance with the present invention taken along lines 3—3 of FIG. 1.

The dosimeter cards 46, 48 and 54 may be inserted according to the invention, with the dosimeter cover 14 open, or also from the side through a slit 56 into the closed encapsulation 10 as shown in FIG. 3.

By providing a nuclear track detector means, the response capability, inter alia, in detector zones "m" and "a" is definitely varied so as to (1) detect albedo neutrons in measuring zone "m" with more sensitivity than thermal neutrons from the scattered radiation field which are primarily detected in measuring zone "a", and (2) in addition to the TLD dosimeters on card 46, detect, under certain circumstances, even smaller neutron doses.

The nuclear track detector foil 54 permits additional detection of fast neutrons via neutron induced recoil nuclei. For this purpose, the portion of the detector foil 54 which is not in contact with (n,α) converters (see field "r" in FIG. 1), may be provided which extends from measuring zones "m" to "a". An additional nuclear track detector for fast neutrons only via neutron induced recoil nuclei can be positioned between card 46 and detector foil 54. Compared to the TLD albedo dosimeters on card 46, the nuclear track albedo dosimeter 54 is insensitive to gamma radiation so that small neutron doses of about 10 mrem can here be detected with preference with a correspondingly high gamma dose proportion of $H_\gamma/H_n > 3$.

Thus, in the present invention, thermoluminescence and nuclear track detectors can be inserted in combination, with the nuclear track detector being covered, under certain circumstances, with different (n,α) converters.

A further advantage is that in addition to the energy dependent albedo dosimeter indication, the equivalent dose of fast neutrons above 1 MeV is indicated almost without dependence on the energy. A corresponding measuring ratio m/r can here be used additionally for the analysis of the scattered neutron field or similarly as the measuring ration m/a, for the correction of the locus dependent sensitivity of the dosimeter indication. Table 2 shows the simplest spectral analysis of the radiation field. The dose components $H_{th}$ and $H_f$ here result from the measured values a and r; the dose component $H_i$ in the energy range of $1 \text{ eV} < E_n < 1.5 \text{ MeV}$ results from the equation $$H_i = H_n - H_{th} - H_f.$$

TABLE 1

| Energy keV | response capability TLD | | | response capability nuclear trace detector | | | |
|---|---|---|---|---|---|---|---|
| | $\frac{m}{H_n}$ | $\frac{a}{H_n}$ | m/a | $\frac{m}{H_n}$ | $\frac{a}{H_n}$ | m/a | $\frac{r}{H_n}$ |
| thermal | 1.04 | 84.4 | 0.0126 | 32.60 | $1.1 \cdot 10^5$ | 0.0294 | — |
| 2 | 11.88 | 6.39 | 1.86 | 20640 | 8640 | 2.39 | — |
| 570 | 0.188 | 0.104 | 1.81 | 294 | 52.1 | 5.64 | — |
| 1200 | 0.0895 | 0.043 | 2.08 | 145.3 | 28 | 5.8 | 6 |
| 2500 | 0.0369 | 0.023 | 1.57 | 76.5 | 17.5 | 4.37 | 12 |

TABLE 2

| No. | m counts | a counts | m/a | Hn Measured mSv | Hn Reference Value mSv | Hn measured / Hn reference | Hth % | Hi % | Hf % |
|---|---|---|---|---|---|---|---|---|---|
| 27 | 268.2 | 1483.0 | 0.181 | 6.14 | 8.55 | 0.72 | 2.87 | 6.41 | 90.72 |
| 29 | 203.8 | 1315.3 | 0.155 | 4.13 | 5.40 | 0.77 | 3.78 | 22.07 | 74.15 |
| 30 | 203.7 | 1295.0 | 0.157 | 4.17 | 4.44 | 0.94 | 3.67 | 28.77 | 67.54 |
| 23 | 333.2 | 2144.9 | 0.155 | 6.72 | 6.97 | 0.96 | 3.78 | 47.29 | 48.93 |
| 20 | 247.6 | 1660.1 | 0.149 | 4.86 | 3.47 | 1.40 | 4.05 | 81.35 | 14.60 |
| 31 | 357.4 | 1916.6 | 0.187 | 8.38 | 6.57 | 1.28 | 2.71 | 86.08 | 11.21 |
| 16 | 234.7 | 1969.1 | 0.119 | 3.87 | 4.50 | 0.86 | 6.02 | 83.90 | 10.08 |
| 40 | 1749.7 | 11632.6 | 0.150 | 34.60 | 30.40 | 1.14 | 39.82 | 57.23 | 2.95 |
| 9 | 44.8 | 457.9 | 0.098 | 0.63 | 0.76 | 0.83 | 8.57 | 91.43 | — |
| 8 | 80 | 756.3 | 0.106 | 1.20 | 0.90 | 1.33 | 7.53 | 92.47 | — |
| 6 | 37.3 | 402.6 | 0.093 | 0.50 | 0.35 | 1.43 | 9.56 | 90.44 | — |
| 5 | 29.8 | 196.7 | 0.152 | 0.59 | 0.63 | 0.94 | 3.88 | 96.12 | — |
| 4 | 15.6 | 194.2 | 0.080 | 0.19 | 0.26 | 0.73 | 12.23 | 87.77 | — |
| 2 | 21.0 | 241.5 | 0.087 | 0.27 | 0.26 | 1.04 | 10.78 | 89.22 | — |

It will be understood that the above description of the present invention is susceptible to various modifications, changes and adaptations, and the same are intended to be comprehended within the meaning and range of equivalents of the appended claims.

What is claimed is:

1. Albedo dosimeter encapsulation for measuring neutron and gamma radiation in at least two dosimeter zones, comprising:
   (a) a casing having boron or cadmium containing walls which have neutron absorbing capability, said casing having a front side which faces a radiation field and a rear side which faces a body which carries the encapsulation, the rear side of the casing being closed by a cadmium or boron containing rear wall having a first portion and a second portion;
   (b) a cover located at the front side of the casing, the cover having a cadmium or boron containing wall portion and a window portion; and
   (c) the casing having a first zone for holding a first dosimeter means and a second zone for holding a second dosimeter means, for first zone being aligned with the cadmium or boron containing wall portion of the cover and the first portion of the rear wall, and the second zone being aligned with the window portion of the cover and the second portion of rear wall, the cadmium or boron containing wall portion of the cover having a neutron absorbing capability which is different from the neutron absorbing capability of the first portion of the rear wall, and the first portion of the rear wall having a neutron absorbing capability which is different from the neutron absorbing capability of the second portion of the rear wall.

2. Albedo dosimeter encapsulation as defined in claim 1, wherein the encapsulation contains thermoluminescence detector means and nuclear track detector means.

3. Albedo dosimeter encapsulation as defined in claim 2, wherein the thermoluminescence detector means is on one dosimeter card and the nuclear track detector means is on a second dosimeter card.

4. Albedo dosimeter encapsulation as defined in claim 2 or 3, wherein the nuclear track detector means is covered by different (n,α) converters.

5. Albedo dosimeter encapsulation as defined in claim 1, 2 or 3, wherein the casing has a block shape.

6. Albedo dosimeter encapsulation as defined in claim 1, wherein a slit is provided for insertion of a dosimeter card into the interior of the housing.

7. Albedo dosimeter encapsulation as defined in claim 1, wherein the neutron absorption capability of the second portion of the rear wall is greater than the first portion of the rear wall, and the neutron absorption capability of the cadmium or boron containing portion of the cover is greater than the first portion of the rear wall.

8. Albedo dosimeter encapsulation as defined in claim 1 or 7, wherein the wall thicknesses of the first and second wall portions of the rear wall are different from each other to provide the different neutron absorption capability, and the wall thickness of the first wall portion of the rear wall and the cadmium or boron containing wall portion of the cover are different from each other to provide the different neutron absorption capability.

9. Albedo dosimeter encapsulation as defined in claim 1 or 7, wherein the amount of cadmium or boron in the first wall portion of the rear wall differs from the amount in the second wall portion of the rear wall to provide the different neutron absorption capability, and the amount of cadmium or boron in the first wall portion of the rear wall differs from the amount in the cadmium or boron containing wall portion of the cover to provide the different neutron absorption capability.

* * * * *